US005571959A

United States Patent [19]

Griggs

[11] Patent Number: 5,571,959
[45] Date of Patent: Nov. 5, 1996

[54] 250PFNT SERIES PORTABLE FUEL NOZZLE TESTER

[75] Inventor: Kevin P. Griggs, 240 W. Rhodena Dr., Coupeville, Wash. 98239

[73] Assignee: Kevin P. Griggs, Coupeville, Wash.

[21] Appl. No.: 188,753

[22] Filed: Jun. 24, 1994

[51] Int. Cl.[6] .......... F02M 65/00; G01M 15/00

[52] U.S. Cl. .......... 73/118.1; 73/117.1; 73/119 A

[58] Field of Search .......... 73/118.1, 117.1, 73/119 A, 49.7, 47

[56] References Cited

U.S. PATENT DOCUMENTS

| | | | |
|---|---|---|---|
| 2,703,979 | 3/1955 | Shallenberg | 73/49.7 |
| 2,744,407 | 5/1956 | Kruger et al. | 73/49.7 |
| 3,511,087 | 5/1970 | Emerson et al. | 73/119 A |
| 4,788,858 | 12/1988 | Liebermann | 73/119 A |
| 4,845,979 | 7/1989 | Farenden et al. | 73/119 A |
| 5,000,043 | 3/1991 | Bunch, Jr. et al. | 73/119 A |

FOREIGN PATENT DOCUMENTS

| | | | |
|---|---|---|---|
| 56-110558 | 9/1981 | Japan | 73/119 A |

*Primary Examiner*—Hezron E. Williams
*Assistant Examiner*—Eric S. McCall

[57] ABSTRACT

The 250PFNT is a self contained Portable Fuel Nozzle Tester incorporating a cabinet and frame assembly which houses all utility needs required to operate. It is a compact unit enabling safe and environmentally friendly testing of Allison Model 250 turbine engine fuel nozzles through-out the full operating pressure range. Industrial dry nitrogen is used to deliver regulated pressurized fluid to the fuel nozzle being tested. The fuel nozzle is mounted in a swivel adapter at the top of a viewing cabinet fitted with fixed protractors for patternization angle measurement. The cabinet is illuminated for better viewing by a battery operated lamp.

2 Claims, 2 Drawing Sheets

| | |
|---|---|
| 1 | Cabinet & Frame Assy. |
| 2 | Fluid Cylinder |
| 3 | Cap & Feed Tube Assy. |
| 4 | Fuel Nozzle Adapters |
| 5 | Hose Assy. |
| 6 | Lamp & Battery Pack |
| 7 | Nitrogen Cylinder |
| 8 | Nitrogen Regulator |
| 9 | Pressure Relief Valve |
| 10 | Delivery Pressure Guage |
| 11 | Fluid Filter |
| 12 | Ball Valve |
| 13 | Protractors |

Figure 1
1 Cabinet & Frame Assy.
2 Fluid Cylinder
3 Cap & Feed Tube Assy.
4 Fuel Nozzle Adapters
5 Hose Assy.
6 Lamp & Battery Pack
7 Nitrogen Cylinder
8 Nitrogen Regulator
9 Pressure Relief Valve
10 Delivery Pressure Guage
11 Fluid Filter
12 Ball Valve
13 Protractors
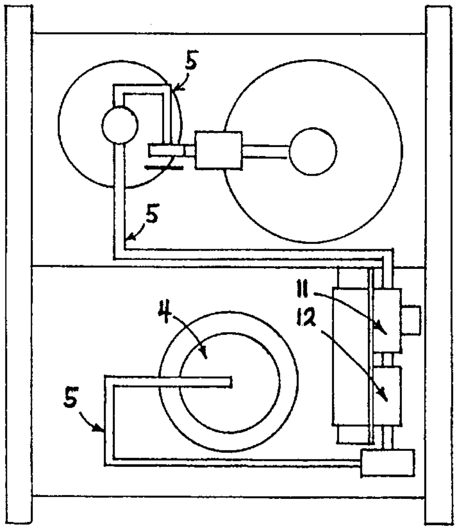
Fig. 1A
Fig. 1C
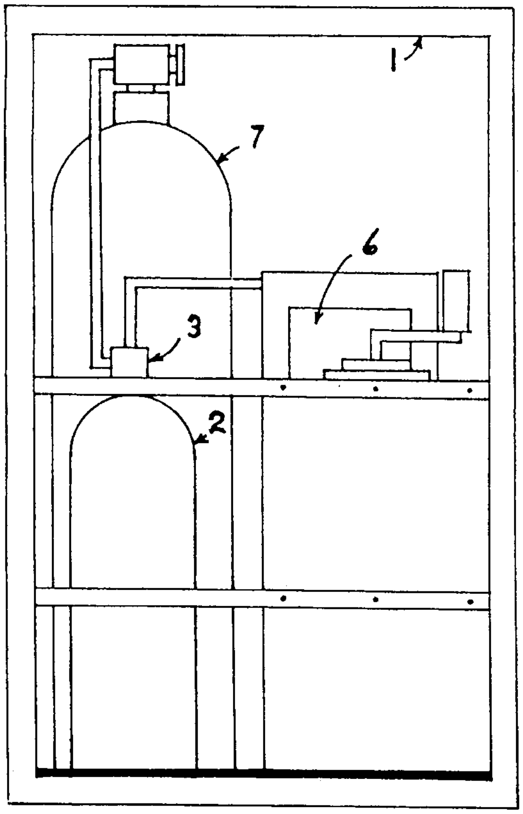
Fig. 1B
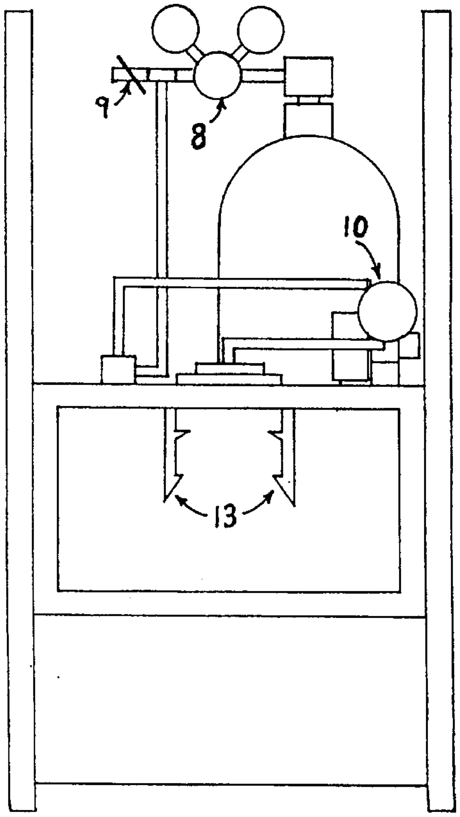

Figure 2
1 Fuel Nozzle Test Fixture
2 Leakage Test Fixture
3 Plug Screw
4 Blanking Plug
5 Fule Nozzle (to be tested)
6 Connecting Tube
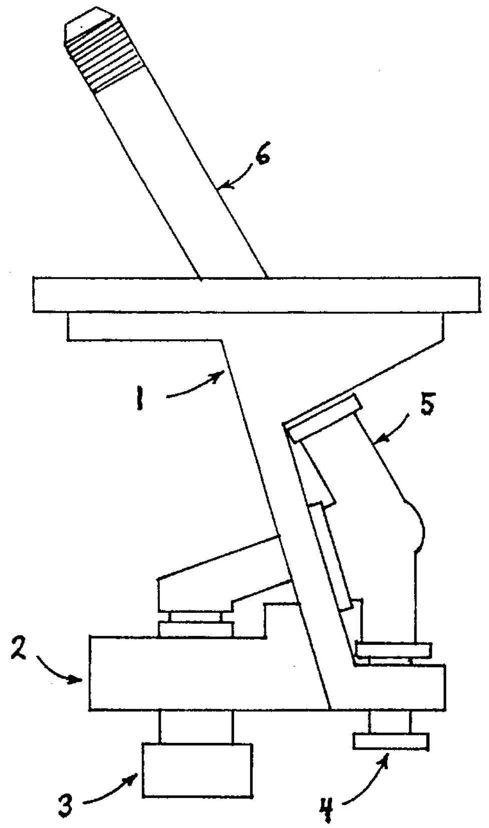
Fig. 2A
Fig. 2B
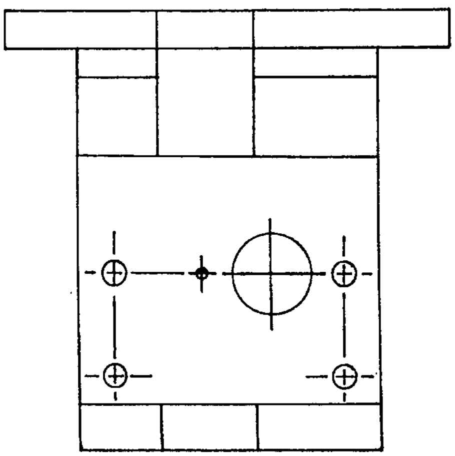

250PFNT SERIES PORTABLE FUEL NOZZLE TESTER

BACKGROUND OF THE INVENTION

The 250PFNT series Portable Fuel Nozzle Tester provides helicopter and fixed wing operators with a means of flow testing the turbine engine fuel nozzles of Allison Model 250 engines. The tester enables periodic field level flow patternization testing to be accomplished on site rather than having to send the items to an overhaul facility thereby reducing costs and turnaround time.

DESCRIPTION OF PRIOR ART

To my knowledge, there is no prior specification which describes a self contained, portable fuel nozzle tester capable of testing the Allison Model 250 fuel nozzles through-out the full operating pressure range.

SUMMARY OF THE INVENTION

The 250PFNT tester is portable and completely self contained and is capable of testing the Allison Model 250 engine fuel nozzle through-out the full operating pressure range. The tester requires no external power or utility source to function. The tester operates on the simple concept of using industrial dry nitrogen to pressurize a fluid cylinder filled with AVTUR or calibration fluid for delivery of the fluid to the fuel nozzle at regulated pressures. The fuel nozzle is mounted in a cabinet with a plexiglass viewing window. Flow patternization is illuminated by a battery operated lamp.

A further extension of the tester's capability is provided by a special mount adapter to facilitate Pratt & Whitney PT6 fuel nozzles to be tested as well.

BRIEF DESCRIPTION OF THE DRAWINGS

The 250PFNT Tester will be more fully understood by reference to the following detailed description thereof when read in conjunction with the attached drawings:

FIG. 1 is a three view drawing showing the dimensions and positioning of major components comprising the basic tester assembly.

FIG. 2 is a side view of the P&W PT6 fuel nozzle mount adapter showing the major components and how the fuel nozzle is mounted.

DETAILED DESCRIPTION OF THE DRAWINGS

The 250PFNT Tester includes a Cabinet & Frame Assembly (1) having a viewing window, and fixed protractors for flow angle measurement. A Fluid Cylinder (2) having a Cap & Feed Tube Assembly (3) is fitted to the frame assembly behind the cabinet. A Nitrogen Cylinder (7) with Regulator (8) having a Pressure Relief Valve (9) are also fitted to the frame assembly behind the cabinet. A Delivery Pressure Gauge (10), Fluid Filter (11) and Ball Valve (12) are fitted to the top of the cabinet on a bracket. Also mounted to the bracket is a Battery Pack (6) for the lamp assembly which is mounted inside the cabinet. Aircraft quality Hoses (5) are connected between the Nitrogen Regulator, Fluid Cylinder, Filter/Valve Assy and Fuel Nozzle being tested. Fuel Nozzle Adapters (4) mount in the top of the cabinet to accommodate the type of nozzle being tested.

The P&W PT6 Fuel Nozzle Adapter consists of a Test Fixture to which the fuel nozzle is mounted and a Leakage Test Adapter with Plug Screw to check for leaks after fitment of a new tip. A Hose Coupling and Blanking Plug are also provided.

What I claim as my invention is:

1. A portable, self-contained fuel nozzle tester capable of testing gas turbine engine fuel nozzles through-out a full operating range comprising:

a cabinet and frame assembly having a viewing window and fixed protractors for nozzle flow angle measurement;

a fluid cylinder having a cap and feed tube assembly, and fitted to the cabinet and frame assembly behind the cabinet;

a nitrogen cylinder having a regulator with a pressure relief valve, and fitted to the cabinet and frame assembly behind the cabinet;

a delivery pressure gauge, fluid filter, and ball valve assembly fitted to a top of the cabinet on a bracket means;

a battery pack for a lamp assembly mounted to the bracket means on an inside of the cabinet;

hoses connected between the nitrogen cylinder regulator and the fluid cylinder, the fluid cylinder and the delivery pressure gauge, fluid filter, and ball valve assembly, and the delivery pressure gauge, fluid filter, and ball valve assembly and the fuel nozzle being tested; and a fuel nozzle adaptor which mounts on top of the cabinet to accommodate a type of fuel nozzle being tested.

2. The fuel nozzle tester as set forth in claim 1, wherein the fuel nozzle adaptor includes a test fixture to which the fuel nozzle is mounted, a leakage test adaptor with a plug screw to check for leaks after fitting a new nozzle, a hose coupling, and a blanking plug.

* * * * *